INVENTOR.
RICHARD A. BOWERS
BY
ATTORNEY

July 15, 1969  R. A. BOWERS  3,455,398
POWER RAKE AND AERATOR ATTACHMENT
Filed Jan. 24, 1966  3 Sheets-Sheet 2
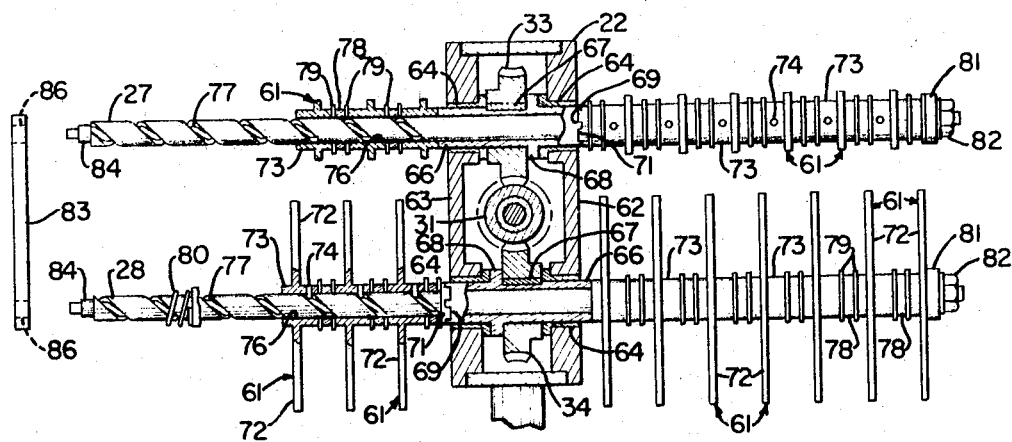
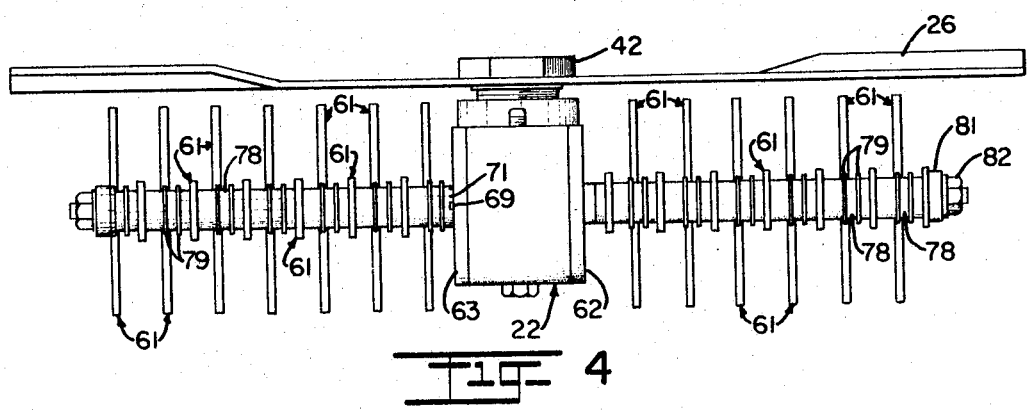
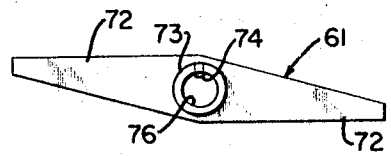
INVENTOR.
RICHARD A. BOWERS
BY
ATTORNEY July 15, 1969  R. A. BOWERS  3,455,398
POWER RAKE AND AERATOR ATTACHMENT
Filed Jan. 24, 1966  3 Sheets-Sheet 3

INVENTOR.
RICHARD A. BOWERS
BY
ATTORNEY

United States Patent Office 3,455,398
Patented July 15, 1969

3,455,398
POWER RAKE AND AERATOR ATTACHMENT
Richard A. Bowers, Northglenn, Colo.
(2139 S. Zephyr St., Denver, Colo. 80227)
Filed Jan. 24, 1966, Ser. No. 522,608
Int. Cl. A01b 45/02, 33/02, 39/08
U.S. Cl. 172—21
13 Claims

ABSTRACT OF THE DISCLOSURE

An attachment utilizing the structural features of lawn mowers other than the cutting blade, to provide a power rake or aerator to power a horizontally disposed driven shaft upon which forks or penetration rotating members may be disposed for engagement with a lawn or turf surface. The shafts themselves together with the rotating members thereon provide a resilient mounting providing rotational and reciprocal freedom of movement for the rotating members. A worm gear reduction with a clutch element, is provided, to move the worm gear out of engagement with the worm wheel. A suction fan is mounted on the drive shaft for lifting and expelling materials loosened by the power rake components.

---

Figure 1:
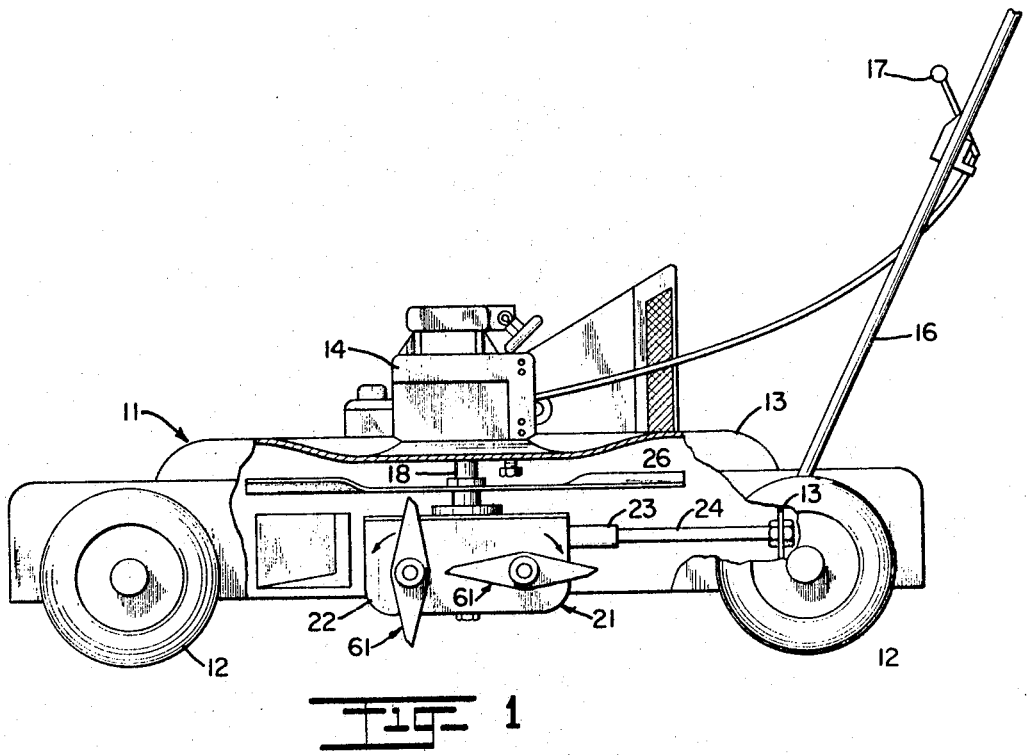

In recent years many writers in the field of gardening and lawn culture have stressed the advantages to be gained from subjecting a lawn to aggressive cleaning and aerating operations. It has been written that the removal of dead grass residues from the lawn can improve the health of the lawn, while similar health giving benefits have likewise been noted where the lawn has been aerated.

In order to accomplish the recommended vigorous power raking of the lawn turf, it has been found desirable to provide motor driven means for accomplishing such raking function. Further, while hand aerators have been used to puncture holes in the lawn turf to improve the aeration of lawn roots, it has also been found advisable to provide power means for accomplishing such aerating functions. In general, the home owner has not previously had or owned equipment that would facilitate such operations, and it has usually been necessary for the owner to rent powered equipment in order to obtain the desired results. Since both the power raking and aerating functions are usually best carried out on a seasonal basis, there is a shortage of equipment for this use at the times when the operations would be most beneficial. The cost of renting equipment to accomplish such tasks has also been quite substantial. Accordingly, many home owners are either unable to have the use of the necessary equipment at the desired time or they find the rental cost to be excessive.

In order to avoid the cost and availability deterrents in the accomplishment of these beneficial operations, the present inventor has devised a new type of lawn treatment apparatus which will bring equipment having power raking and aerating capabilities within the budget restrictions of the home owner.

A major objective in providing such equipment for home owners has been to reduce the cost of such equipment by utilizing the structural platform and motor drive of a conventional lawn mower as the drive and carrier system for lawn raking and aerating attachments.

Another object of the invention has been to provide a drive attachment for lawn mowers of such construction and design that it will be useful to drive and operate power lawn rake or aerator attachments.

A further object of the invention is to provide a drive adapter for rotary type lawn mowers whereby the power of the lawn mower engine may be delivered to a horizontal shaft for impelling a lawn rake, an aerator or similar attachments.

Another object of the invention is to provide a gear box attachment that may be coupled to the driven shaft of a lawn mower to provide power for lawn rakes, aerators or other similar attachments.

A further object of the present invention is to provide a center drive type of worm gear that may be connected or selectively disconnected to energize rotational movement of horizontal drive shafts.

A further object of the invention is to provide a gear box attachment that may be coupled to the drive shaft of a lawn mower power unit in a position corresponding to the normal position of a rotary cutter blade whereby power will be delivered by the lawn mower engine to such attachment for the operation of lawn aerator and power rake attachments.

A specific object of the present invention is to provide a horizontal driven shaft, the rotation of which may be used to power the operation of rake or aerator elements.

In connection with the last stated objective, it is a further object of this invention to provide a type of flail which may be mounted directly on a powered horizontal shaft through provision of novel means for absorbing or minimizing shock loadings on the shaft resulting from impingement on the driven flail members with obstructions.

Another related object is to provide resilient means whereby the rotating flails may be moved horizontally with respect to the drive shaft when obstacles are encountered.

A further related object is to provide a flail that is itself made of yielding material in order to further minimize such shock loadings.

Figure 2:
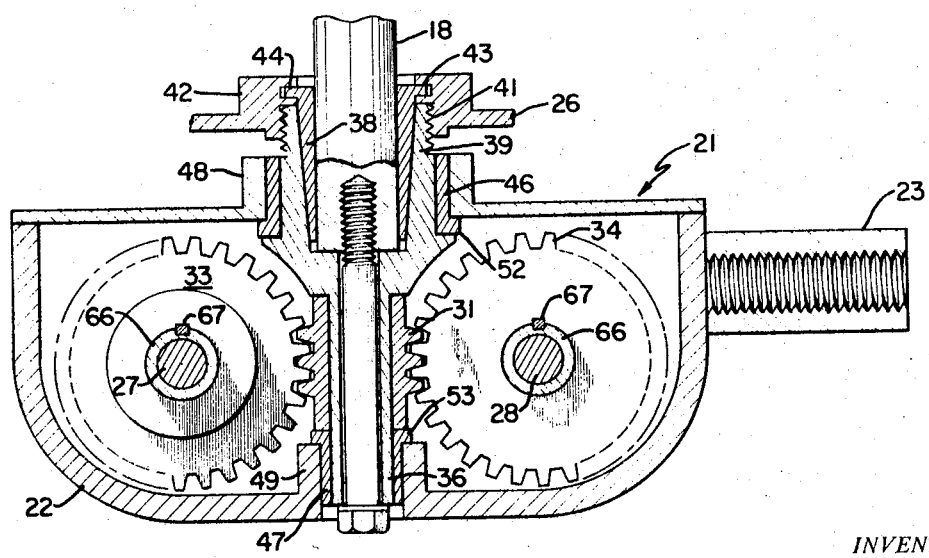
Figure 7:
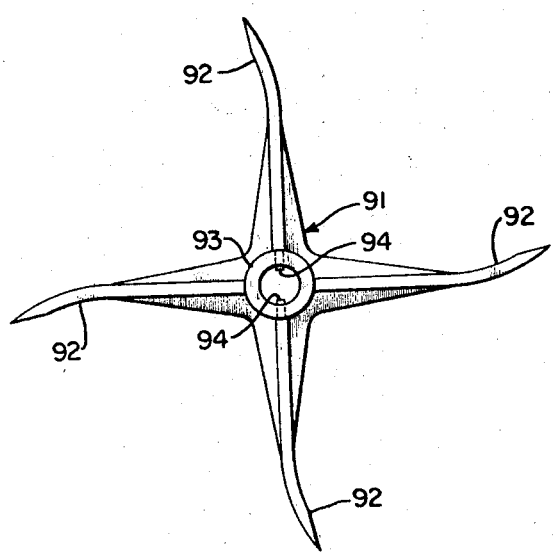
Figure 8:
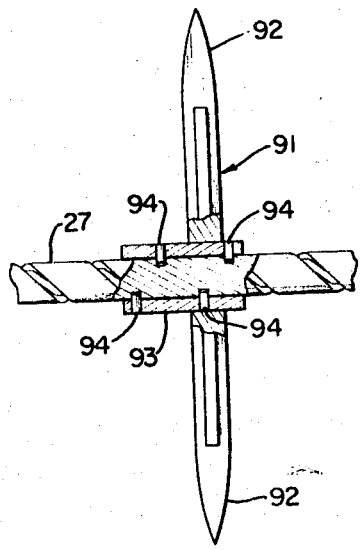
Figure 9:
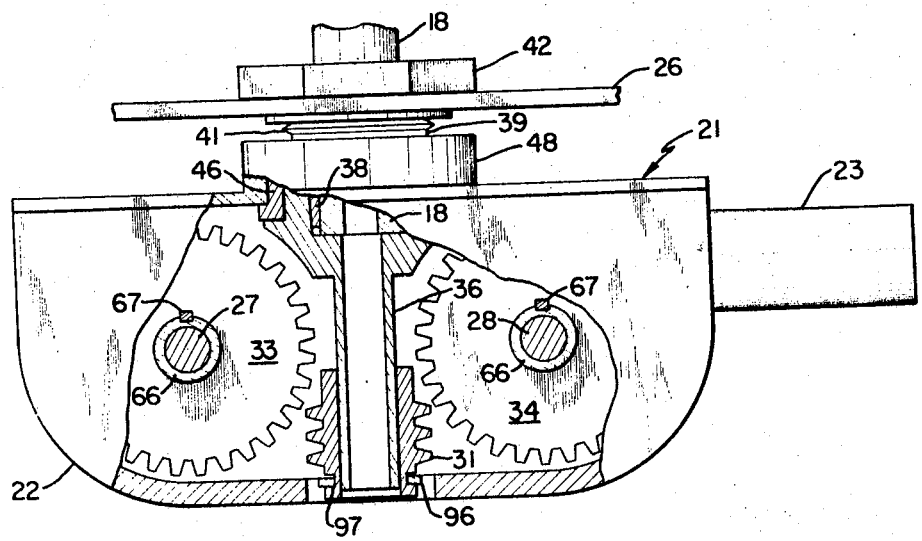

Further objects and advantages of the present invention will be apparent from the appended description and drawings, in which FIG. 1 is a side view illustration in partial cross-section showing the overall arrangement of an embodiment of this invention, FIG. 2 is a cross-sectional elevation taken through the gear box drive unit showing features of such element, FIG. 3 is a cross-sectional plan view taken downwardly through the drive shaft of said lawn mower attachment showing details of the horizontal shaft and its drive, FIG. 4 is a front elevation of the mechanism shown in FIG. 3, FIG. 5 is a side elevation showing the construction of a preferred type of flail, FIG. 6 shows an alternate type of resilient flail, FIG. 7 is a side elevation showing an aerator blade adapted for use on the driven horizontal shaft of said attachment, FIG. 8 is a front view in partial section of the aerator blade shown in FIG. 7, and FIG. 9 is a side elevation in partial cross-section showing the gear box attachment and a clutching mechanism therefor.

Briefly stated, the present invention provides an attachment which may be joined to the drive shaft of a lawn mower to power a horizontally disposed driven shaft upon which flails or penetration rotating members may be disposed for engagement with a lawn or turf surface. A gear box reduction drive is provided to transmit the power from the motor or engine shaft to said horizontal driven shafts, and the shafts themselves together with the rotating members thereon provide a resilient mounting whereby any haphazard engagement with obstacles on the lawn surface will not damage the rotating members or other components of the attachment. When the aerator rotating members are to be used, a clutch element is to be incorporated in the drive mechanism so that movement of the lawn mower may be controlled.

FIGS. 1 through 5 show a power rake configuration for a preferred embodiment of the invention. In this preferred embodiment a lawn mower 11 of the rotary type which normally is used to drive a horizontally disposed rotating cutter blade is used to drive a power rake attachment. The structure which is common to the lawn mower configuration includes the support wheels 12, the overall frame 13, an engine drive unit 14, an operator handle 16, an engine control member 17, and the powered shaft 18 of the engine 14. The rotary cutter blade, which is normally mounted on the shaft 18 and which is used in connection with lawn mowing operations, has been removed, and a horizontal shaft drive attachment 21 has been positioned on the engine shaft 18 at a position beneath the hood or frame 13 of the lawn mower 11. The attachment 21 includes a gear box 22 which is held in position beneath the frame hood 13 by a torque anchor 23, and adjusting bolt 24 which ties the gear box to a component of the frame 13 and prevents rotation of the gear box due to the torque exerted by the shaft 18. A fan 26 is also attached to the engine drive shaft 18 in position above the gear box 22.

The gear box itself serves to convert the rotary motion of the vertically disposed engine drive shaft 18 to rotating movement of the horizontal driven shafts 27 and 28 which rotate at a decreased speed but at increased torque when compared to the engine shaft 18.

The desired movement of the driven shafts 27 and 28 is accomplished through provision of a worm gear arrangement, as shown in FIG. 2. Here, it will be seen that a worm 31 is in meshing engagement with mated front and rear gears 33 and 34 so that when the worm 31 is rotated, the gears 33 and 34 will likewise be rotated at a slower speed and in directions opposite one to the other. In order to couple the worm 31 to the engine shaft 18, a collet type of linkage is used to drive an intermediate spindle 36 to which the worm 31 is engaged. The collet assembly includes the split collet 38, a wedge receptacle 39 which is provided with threads 41 at its upper exposed extremity, and a lock drive nut 42 which is provided with a groove recess 43 which engages a flange 44 on the upper end of the collet 38 so that as the lock 42 is tightened on the threads 41 of the wedge receptacle 39, the collet 38 will be brought into tighter engagement with the external surface of the engine shaft 18.

In order to facilitate the engagement and locking of the collet assembly, the lock nut 42 is made a part of the fan 26. Accordingly, the ends of the fan blades may be grasped to rotate the nut into its tighter locked position. The particular thread used for the mating threads 39 and 41 will be dictated by the direction of rotation for the engine shaft 18. For engine shafts rotating in a clockwise direction as viewed from above, a left hand thread should be provided on the lock 42. With this combination, rotation of the engine drive shaft will tend to tighten the collet assembly so that the gear box unit will be held more securely on the engine drive shaft 18.

The wedge socket 39 is in the present embodiment made as an integral piece with the spindle 36. Accordingly, rotational movement of the wedge socket 39 with the engine drive shaft 18 will be transmitted to the spindle 36 and the worm 31. In order to reduce the friction drive losses, the socket-spindle assembly rotates in top and bottom bearings 46 and 47 which are mounted in top and bottom bosses 48 and 49 provided by the case 22. Each of the bearings 46 and 47 are provided with thrust shoulders 52 and 53 so that the socket-spindle will be properly constrained within the gear case to absorb thrust forces incident to operation of the worm and gear drive. Actually the engine drive shaft 18 is usually provided with bearings having thrust capacities that would meet the design requirements of the present mechanism.

For the configuration shown with clockwise rotation of the engine drive shaft, a left hand thread should be provided on the worm 31. This will cause the shaft 27 and gear 33 to be rotated in a counter-clockwise direction, and the shaft 28 and gear 34 will be rotated in a clockwise direction. Accordingly, the flails 61 shown in FIG. 1 will be rotated in the directions shown by the arrows. With this combination the ground engagement between the front echelon of flails 61 tends to move the lawn mower 11 in a forward direction, while ground engagement of the rear echelon of flails would normally tend to move the lawn mower in a rearward direction. It has been found, however, that this counter rotation of the flails actually tends to power a slow forward movement of the lawn mower. It is believed that this resultant forward movement is due to the fact that the forward echelon of flails encounters relatively greater resistance as it engages the turf than the rear echelon of flails which pass over the previously attacked surface. The net effect is that when the unit is being used for power raking purposes, there will be a tendency for the unit to continue moving in either operator initiated direction.

The actual means and mechanisms for transmitting the rotation of the gears 33 and 34 to the horizontal driven shafts 27 and 28 are more clearly shown in FIGS. 3 and 4. In FIG. 3 it is seen that the side faces 62 and 63 of the gear box 22 provide support for bearings 64 that are adapted to receive a rotating drive collar 66 which passes through the gears 34 and 33 and rotates therewith due to the presence of keys 67. The collars 66 are provided with a shoulder 68 which is positioned against the thrust flanges of the bearings 64. In order to facilitate the assembly of these components, the side plate 63 is removable from the case 22 so that the bearings, gears and collar may be properly aligned within the case with respect to the worm 31. As shown the collars 66 are hollow so that the shafts 27 and 28 will pass directly through the collars and the gear case.

In order to couple the collar and shafts together, serrated type of dog clutches 69 are provided on the ends of the collars 66 which cooperatively mate with similarly formed clutch members 71 that are welded or otherwise affixed to the shafts 27 and 28. When the dog clutches are properly engaged, the shafts will, accordingly, rotate with the gear driven collars 66.

When the unit is to be used for power raking purposes, a plurality of flails 61 will be disposed in side by side echelon arrangement throughout the length of the shafts 27 and 28. Each of the flails of the flail assembly includes the striker blades 72 which are welded to a tube drive element 73. A small dowell pin 74 of circular cross-section extends through the tube 73 and projects interiorly of the bore 76 in such tube. The size of the bore 76 corresponds to the outer diameter of the shafts 27 and 28, and the dowell 74 projects into the spiral cut grooves 77 formed on the shafts 27 and 28. With this arrangement the flails 61 can be threaded onto the shafts 27 and 28.

The spirial cut grooves 77 and the engaging dowell pins 74 are provided to allow for rotational and reciprocal movement of the flails with respect to the driven shafts 27 and 28. This freedom of movement is required to prevent damage to the flails or shafts when the flails contact or engage loose items or high spots in a turf surface. Freedom of individual movement for the separate flails is obtained by providing spring or resilient elements between each of the flails. In FIGS. 3 and 4 the resilient elements are rubber spacers 78 disposed between washers 79. Coil springs 80 of the type shown on shaft 28 of FIG. 3 could be used alternately in place of the rubber spacers 78. When resilient members are used between the flails 61, each flail will be free to move reciprocally and rotatably about the shafts 27 and 28 when some obstruction is hit. This longitudinal and rotational freedom will be limited only by the guiding movement of the follower pin 74 in the guide slot 77. The degree of freedom provided is not sufficient to permit any interference between the flails disposed on the shafts 27 and 28 even if such flails were in in-phase orientation instead of the 90 degree out-of-way phase position as illustrated.

When a full complement of flails have been assembled on the shafts 27 and 28, an end spacer 81 and lock nut 82 may be installed to hold the flails in their assembled relationship. While the shafts 27 and 28 are of adequate strength to provide good results when operated with the free ends unsupported, it is possible to obtain improved rigidity by providing an outboard linking bar 83 which may be engaged over the end studs 84 of the shafts 27 and 28 so that the studs will then rotate in the guiding holes 86 of the linking bar 83.

The same drive mechanism and attachment may be used to propel and operate a lawn aerator. For aerating functions an aerator blade as shown in FIGS. 7 and 8 is substituted as the impact rotating member in place of the flails shown in FIGS. 3 through 6. Because of the fact that it is desirable to have penetration of the soil in aerating operations, the aerator blade rotating members 91 are of larger dimension than the flails 61. This larger dimension provides for penetrating contact between the digger ends 92 and any turf surface over which the equipment is moved. The larger operating diameter, however, does require removal of one of the driven shafts 27–28. This removal is easily accomplished by pulling the flails off the extremities of one driven shaft so the shaft itself may be moved out of contact with the dog clutch drive 69. The flails 61 are also removed from the remaining shaft, and the aerator rotating members 91 are placed on one driven shaft 27. Due to the greater loading of the aerator blades 91, a multiple number of pins 94 is provided in a longer tube drive element 93. These longer tube drive elements which are again placed on the shaft 27 in spaced positions with a resilient member between adjacent tube drive elements 93 tends to increase the spacing between the aerator blades 91. Aerator blades spaced apart a distance corresponding to the length of the drive elements 93 will give a good soil penetration pattern even though a single driven shaft is used. With four digger ends 92 the holes punctured in a lawn surface by operation of the aerator attachment are substantially equally spaced in both lateral and running directions.

Since the aerator blades 91 actually move into secure engagement with the lawn surface over which the unit is being operated, some additional control of the driven shaft turning rate is required. In order to prevent continuous rotation of the driven shaft and aerator blades whenever the engine is being operated, it is desirable to interpose a clutch mechanism between the engine drive and the output driven shafts 27–28. Such a clutch could operate between the engine shaft 18 and the socket-spindle 39. A belt type drive clutch has previously been used to selectively couple these elements. It has also been found, however, that a desirable clutching action can be provided by a mechanism which moves the worm 31 out of contact with the gears 33 and 34 as illustrated in FIG. 9. With the worm out of contact the gears will, of course, not rotate, and the shafts upon which the aerators are disposed will not turn. A shifting member having a pair of forks 96 is shown engaged in a slot 97 on the body of the worm 31 to forcibly move the worm 31 reciprocally out of contact with the gears 33 and 34. The forks 96 are joined to an operator mechanism (not shown) which extends into the case 21 to move the forks 96 and the worm 31 reciprocally along the spindle 36 with which the worm 31 is drivingly engaged. For the particular worm described, this worm clutching movement works quite well. The worm will tend to thread itself between the spaced gears as soon as a thread of the worm engages a first tooth of either of the gears. Relatively more force must be exerted to disengage the worm when it is desired to halt the rotation of the aerators 91 without stopping the engine 14.

The embodiments shown and described fulfill the objectives stated in a manner that would make it possible for home owners to have power rake and lawn aerator attachments for use as desired. The attachments can be provided for a low cost and may be economically used. The attachment itself may be readily installed on a conventional lawn mower, and either of the rotating member systems can be substituted on the attachment in a short period. Since the lawn mower may be speedily converted to power raking or aerating operations, it is believed that a new and useful power tool is provided.

What is claimed is:

1. A motor driven turf treatment unit for lawn conditioning operations comprising a support frame, wheels on said frame and unit for moving the unit along a turf surface, a motor drive unit on said frame providing a powered shaft, a case structure on said frame, drive engaging means mounted on said case and disposed for attachment to the powered shaft of said motor, an output gear in said case, a driven shaft engaged with said output gear for rotation about a horizontal axis in position closely adjacent to the turf to be conditioned, impact rotating members having an opening therethrough for disposition on said driven shaft in side by side relation, drive connectors operatively interconnecting said driven shaft and impact rotating members whereby said members will be rotated by the driven shaft to bring the members into repeated contact with the turf, and means operative with said drive connectors for allowing rotational and reciprocal freedom of movement for said impact rotating members with respect to the driven shaft to prevent damage to said elements when obstructions on the turf surface are contacted by said rotating members.

2. In motor driven turf treatment apparatus, an attachment for lawn conditioning operations comprising a case structure, drive engaging means mounted on said case and disposed for attachment to a powered shaft of said apparatus, an output gear in said case, a driven shaft engaged with said output gear for rotation about a horizontal axis in position adjacent to the turf to be conditioned, impact rotating members having an opening therethrough for disposition on said driven shaft in side by side relation, drive connectors operatively interconnecting said driven shaft and impact rotating members whereby said members will be rotated by the driven shaft to bring the members into repeated contact with the turf, and means operative with said drive connectors for allowing rotational and reciprocal freedom of movement for said impact rotating members with respect to the driven shaft to prevent damage to said elements when obstructions on the turf surface are contacted by said rotating members.

3. Structure as set forth in claim 2 wherein said driven shaft is disposed in a horizontal plane and in a direction transverse to the normal direction of travel for said apparatus.

4. Structure as set forth in claim 2 inclusive of a gear system in said case structure having a worm drive gear rotated by said drive engaging means and an output gear meshing with said worm with the axis of said output gear disposed in a horizontal plane.

5. Structure as set forth in claim 4 wherein said driven shaft passes through said output gear to extend laterally from opposite sides of said case structure, said structure further comprising drive means for selectively interconnecting said output gear and driven shaft.

6. Structure as set forth in claim 4 wherein said worm meshes with a plurality of output gears, and further comprising a plurality of spaced apart and parallel driven shafts engaging each of said output gears with said driven shafts being disposed in a horizontal plane.

7. Structure as set forth in claim 6 wherein the impact rotating members are disposed on said driven shafts with the impact members of all driven shafts being disposed in non-interfering relationship with respect to the impact members of other driven shafts.

8. Structure as set forth in claim 7 wherein said impact rotating members are flails having a centered opening therethrough and opposed turf contacting ends extending equal distances outwardly from the center opening whereby said attachment may be used as a power rake.

9. Structure as set forth in claim 3 wherein said impact rotating members are aerator blades having a centered opening therethrough and opposed turf contacting ends extending equal distances outwardly from the opening therethrough whereby said attachment may be used for lawn aerator purposes.

10. Structure as set forth in claim 9 inclusive of clutch means intermediate the drive engaging means and said driven shaft whereby rotation of said driven shaft may be selectively interrupted.

11. Structure as set forth in claim 4 inclusive of clutch means intermediate the drive engaging means and said driven shaft for moving said worm drive gear toward and away from positions of engagement with said output gear whereby rotation of said driven shaft may be selectively interrupted.

12. In a lawn mower normally providing a housing-frame structure, support wheels on said frame for moving the unit along a turf surface, a drive motor and a cutting blade operatively connected to said drive motor, an attachment for use in place of said cutting blade comprising engaging means for attachment to the cutting blade drive of said lawn mower, reduction means connected to said engaging means and providing an output drive at reduced speed, a driven shaft engaged to said output drive for rotation about a horizontal axis in position closely adjacent to the turf to be conditioned, impact rotating members having an opening therethrough for disposition on said driven shaft in side by side relation, drive connectors operatively interconnecting said driven shaft and impact rotating members whereby said members will be rotated by the driven shaft to bring the members into repeated contact with the turf, and means operative with said drive connectors for allowing rotational and reciprocal freedom of movement for said impact rotating members with respect to the driven shaft to prevent damage to said elements when obstructions on the turf surface are contacted by said rotating members.

13. In a lawn mower normally having a housing-frame structure providing a discharge opening for grass cuttings, support wheels on said frame for moving the unit along a turf surface, a drive motor and a cutting blade operatively connected to said drive motor for cutting grass and delivering the cut grass through said discharge opening, an attachment for use in place of said cutting blade comprising a discharge fan on the cutting blade drive of said lawn mower, engaging means for attachment to the cutting blade drive of said lawn mower, reduction means connected to said engaging means and providing an output drive at reduced speed, a driven shaft engaged to said output drive for rotation about a horizontal axis in position closely adjacent to the turf to be conditioned, impact rotating members for disposition in side by side relation, drive connectors operatively interconnecting said driven shaft and impact rotating members whereby said members will be rotated by the driven shaft to bring the members into repeated contact with the turf, and means operative with said drive connectors for allowing relative freedom of movement between said impact rotating members and the driven shaft to prevent damage to said elements when obstructions on the turf surface are contacted by said rotating members, said fan being operative to move and discharge materials loosened by the impact rotating members through the discharge opening of said housing-frame.

References Cited

UNITED STATES PATENTS

| | | | |
|---|---|---|---|
| 2,823,597 | 2/1958 | Kelsey | 172—103 X |
| 2,860,475 | 11/1958 | Richard | 56—294 X |
| 2,975,839 | 3/1961 | Burrows et al. | 172—42 X |
| 3,123,149 | 3/1964 | White | 172—42 |
| 3,190,064 | 6/1965 | Wenzel et al. | 56—249 X |

ABRAHAM G. STONE, Primary Examiner

STEPHEN C. PELLEGRINO, Assistant Examiner

U.S. Cl. X.R.

172—103, 123, 247, 264